L. TORGERSON.
DRIVE PULLEY.
APPLICATION FILED APR. 25, 1910.

981,500.

Patented Jan. 10, 1911.

Witnesses

Inventor
Lewis Torgerson.
By his Attorney

UNITED STATES PATENT OFFICE.

LEWIS TORGERSON, OF TURTLE LAKE, NORTH DAKOTA.

DRIVE-PULLEY.

981,500. Specification of Letters Patent. Patented Jan. 10, 1911.

Application filed April 25, 1910. Serial No. 557,477.

*To all whom it may concern:*

Be it known that I, LEWIS TORGERSON, a citizen of the United States of America, residing at Turtle Lake, in the county of McLean and State of North Dakota, have invented certain new and useful Improvements in Drive-Pulleys, of which the following is a specification, reference being had therein to the accompanying drawing.

This invention relates to pulleys, and has for its object to provide an improved pulley so constructed and arranged as to be strong and durable, and which can be easily formed and readily taken apart if desired.

The invention consists in a pulley constructed and arranged as hereinafter set forth.

Figure 1:
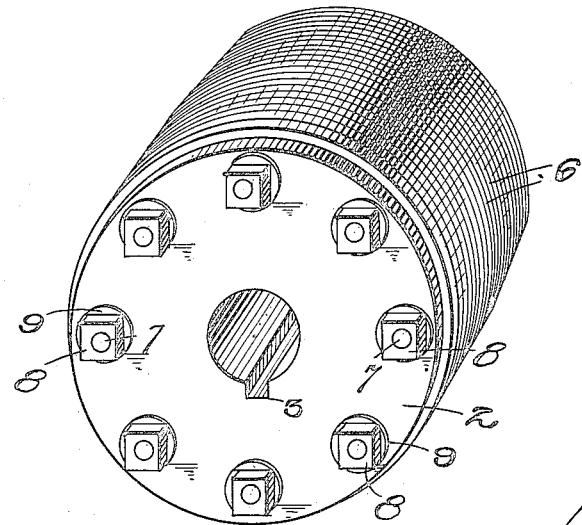
Figure 3:
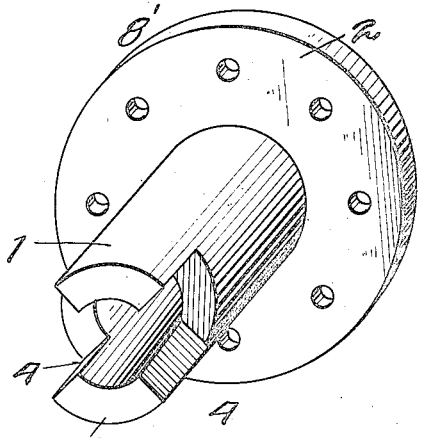
Figure 2:
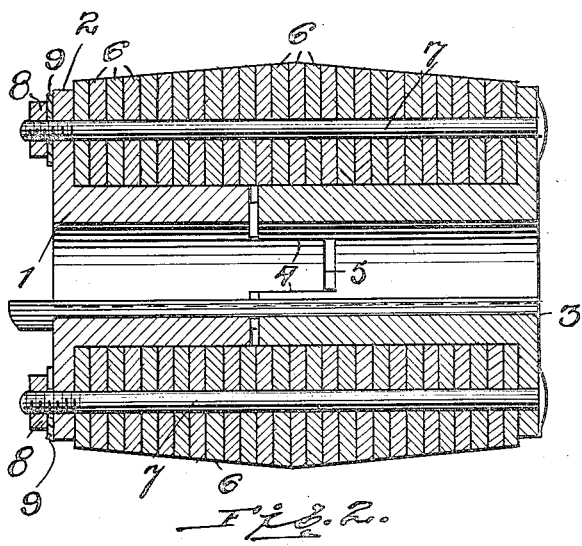

Referring to the accompanying drawings: Figure 1 is a view in perspective of a pulley constructed in accordance with this invention. Fig. 2 is a longitudinal section thereof. Fig. 3 is a detail view in perspective of one of the parts of the core.

In carrying out the invention, I provide a core formed in two parts, each part consisting of a tubular member 1 having a disk shaped flange 2 at one end, the tubular portion and the flange of the core is formed with a key way 3. The inner end of each portion 1 is provided with two segmental openings 4 and projections 5, the two sets of projections being designed to fit into the openings 4 and having their ends spaced from the inner ends of said openings as shown in Fig. 2.

The pulley is built up of a number of flat rings 6 of leather or other suitable material, the outer edges of said flat rings being shaped so as to present the desired surface for the face of the pulley. Each of the tubular projections 1 of the core has slid over it a number of the flat rings 6 until it is entirely covered, and then the tubular projections 1 are locked together by the projections 5 thereof being fitted into the segmental openings 4. The sections of the core are fastened together and the flat rings 6 secured and clamped upon the core between the flanges 2 thereof by means of a number of rods 7 extending through holes 8 in the flanges 2 and through holes in the flat rings 6, the parts being held in fastened position by means of nuts 8 on the ends of the rods 7 which are screwed up against washers 9 bearing against the flange 2.

It will be seen that by means of this invention a strong and durable pulley is provided which is simple and economical of construction, and which is formed of parts which may be readily and easily assembled and taken apart for repair or other purposes.

Having described the invention, I claim:

A pulley of the character described comprising a plurality of tubular sections provided with flanged disks on opposite ends having a series of openings therein, said sections having projections provided with clutch members thereon which are adapted to interlock with each other and having their ends spaced apart, rings mounted upon said sections and provided with openings registering with said flange openings, rods passing through said openings, and means on said rods whereby to clamp said rings between said flanges.

In testimony whereof I hereunto affix my signature in presence of two witnesses.

LEWIS TORGERSON.

Witnesses:
B. GRUNIM,
R. T. LIERBOE.